(12) United States Patent
Tillman

(10) Patent No.: US 7,995,718 B1
(45) Date of Patent: Aug. 9, 2011

(54) METHODS AND SYSTEMS USING A TELEPHONE NUMBER SERVER (TNS)

(76) Inventor: Chad Dustin Tillman, Charlotte, NC (US)

( * ) Notice: Subject to any disclaimer, the term of this patent is extended or adjusted under 35 U.S.C. 154(b) by 1732 days.

(21) Appl. No.: 10/906,888

(22) Filed: Mar. 10, 2005

Related U.S. Application Data

(63) Continuation-in-part of application No. 10/961,823, filed on Oct. 8, 2004, now abandoned.

(60) Provisional application No. 60/509,464, filed on Oct. 8, 2003.

(51) Int. Cl.
*H04M 1/64* (2006.01)

(52) U.S. Cl. ............... 379/88.17; 379/88.13; 379/88.14; 379/93.17; 379/201.01; 370/352

(58) Field of Classification Search ............ 379/201.01, 379/355.02, 88.13; 705/1
See application file for complete search history.

(56) References Cited

U.S. PATENT DOCUMENTS

| | | | |
|---|---|---|---|
| 6,516,311 B1 * | 2/2003 | Yacoby et al. ................. | 1/1 |
| 6,658,100 B1 * | 12/2003 | Lund ............... | 379/201.01 |
| 6,917,822 B1 * | 7/2005 | Mori et al. ............ | 455/564 |
| 7,139,370 B1 * | 11/2006 | Tse ........................ | 379/88.17 |
| 2002/0181670 A1 * | 12/2002 | Myers et al. .............. | 379/88.13 |
| 2004/0083114 A1 * | 4/2004 | Yue .......................... | 705/1 |

* cited by examiner

*Primary Examiner* — Curtis Kuntz
*Assistant Examiner* — Joseph J Nguyen
(74) *Attorney, Agent, or Firm* — Tillman Wright, PLLC; Chad D. Tillman; James D. Wright

(57) ABSTRACT

A telephone number server (TNS) of a first party maintains telephone numbers of third parties in association with respective Internet information of the third parties. Upon request from a second party, the request including information indicative of a third party's telephone number, the second party searches the TNS and communicates to the second party the Internet information in the TNS that is associated with the third party's telephone number. The Internet information may include only a particular website address of the third party. If the telephone number is a customer service number, the website address may relate to the third party's customer service. Moreover, the website may include real time information, such as the current hold time for speaking with a customer service representative. The website further may provide other contact information for customer service, including web-based email or other direct call numbers for certain inquiries or issues.

19 Claims, 1 Drawing Sheet

METHODS AND SYSTEMS USING A TELEPHONE NUMBER SERVER (TNS)

CROSS-REFERENCE TO RELATED APPLICATIONS

The present application is a continuation-in-part of, and claims priority under 35 U.S.C. §120 to, U.S. nonprovisional patent application Ser. No. 10/961,823, filed Oct. 8, 2001, now abandoned, which application is hereby incorporated herein by reference, and which is a nonprovisional patent application of, and claims priority under 35 U.S.C. §119(e) to, U.S. provisional patent application Ser. No. 60/509,464, filed Oct. 8, 2003, which provisional patent application is hereby incorporated herein by reference.

COPYRIGHT STATEMENT

All of the material in this patent document is subject to copyright protection under the copyright laws of the United States and of other countries. The copyright owner has no objection to the facsimile reproduction by anyone of the patent document or the patent disclosure, as it appears in the Patent & Trademark Office file or records but, otherwise, all other copyright rights whatsoever are reserved.

BACKGROUND OF THE INVENTION

The present invention generally relates to software, devices, methods, and systems that include telephonic capabilities.

SUMMARY OF THE INVENTION

One aspect of the present invention relates to a data processing device. In a feature of this aspect, a data processing device includes computer-readable medium having computer-executable instructions for performing a method. The method includes the steps of generating a graphical user input (GUI) for receiving information from a user of the data processing device; performing steps related to the browsing of a computer network; and performing steps related to the making of a telephone call. The steps relating to the browsing of a computer network include receiving via said generated GUI information indicative of an IP address; requesting information from the IP address; receiving information based on said requested information from the IP address; and displaying information on a display based on said received information from the IP address. The steps relating to the making of a telephone call include receiving via said generated GUI information indicative of a telephone number to be called; and initiating a telephone call to the telephone number indicated by said received information.

The information indicative of an IP address and the information indicative of a telephone number both may be received through the same data input area of said GUI. Furthermore, the computer-executable instructions may be part of a web browsing program. In this regard, the information indicative of an IP address and said information indicative of a telephone number are both received through a data input area of a tool bar of the web browser. The tool bar may comprises an address bar of the web browser, or a search engine tool bar.

The received information indicative of an IP address may comprise other than the actual IP address. In this regard, the method further comprises the step of resolving the received information to the actual IP address. For example, the received information may comprise a uniform resource locator (URL), in which case the method includes the step of looking up the IP address for the URL (as used herein, "website address" generally refers to a URL or IP address). The received information may comprise simply a domain name, in which case the method includes the step of looking up the IP address for the domain name.

Preferably, the received information indicative of a telephone number to be called is received in a predefined format that indicates that the information received is indicative of a telephone number and that the information is not indicative of an IP address. For example, the format of the information received may includes "tel" thereby indicating that the information received is indicative of a telephone number. The format of the information received also may include a seven digit number. The syntax of the seven digit number may be XXX-XXXX, and wherein each "X" represents a number 0 through 9 and may be an alphanumeric character. Alternatively, the syntax of the seven digit number may be XXX.XXXX. The format of the information received further may include information indicative of an area code or a country code.

If the received information indicative of a telephone number to be called comprises other than the actual telephone number to be called, then the method preferably includes the further step of resolving said received information to the actual telephone number. The step of resolving said received information to the actual telephone number preferably includes looking up the actual telephone number from a database in which an association is maintained between said received information and the actual telephone number. The database may be maintained local to the data processing device or may be maintained remotely to the data processing device. If maintained remotely, then the database may be accessed via the Internet. In this regard, the database preferably is a public resource that is accessed over the Internet.

In another feature of this aspect, a data processing device includes computer-readable medium having computer-executable instructions for performing a method. The method includes the steps of receiving information from the first party indicative of a telephone number of a third party to be called; retrieving, from a database of the data processing device, information based on said received information; and displaying information based on said retrieved information for viewing. Furthermore, in accordance with this feature, the retrieved information pertains to one or more previous telephone calls to the third party. The method further preferably includes the step of recording information pertaining to an initiated call for future retrieval and display when said method is performed again The step of retrieving the information preferably comprises searching said database in which information is maintained in association with telephone numbers and, upon finding information that is maintained in association with the telephone number indicated in said received information, returning the found information from said database. The method further may include the step of initiating a telephone call to the telephone number of the third party that is indicated by said received information. The database may include an address book that is maintained by said data processing device.

The displayed information may pertain to one or more previous telephone calls made to the telephone number of the third party. Furthermore, the displayed information may include a website address of the third party that is maintained in said database, in which case the method preferably includes the further step of downloading and displaying information published by the third party on the Internet at the website address. Moreover, the displayed information may include information pertinent to the subject of the telephone call; customer service information and the telephone number is a customer service telephone number; technical support information and the telephone number is a technical support telephone number; information about the third party and the telephone number is for purchasing products from the third party; information about the third party and the telephone number is for purchasing services from the third party; information about products and the telephone number is for purchasing products from the third party; information about services and the telephone number is for purchasing services from the third party; information about product support information and the telephone number is for product support by the third party; or any combination of the foregoing.

In yet another feature of this aspect, a data processing device includes computer-readable medium having computer-executable instructions for performing a method. The method includes the steps of receiving information from the first party indicative of a telephone number of a third party to be called; retrieving, from a database remotely located to the data processing device, information based on said received information; and displaying information based on said retrieved information for viewing. The step of retrieving the information preferably comprises searching said database in which information is maintained in association with telephone numbers and, upon finding information that is maintained in association with the telephone number indicated in said received information, returning the found information from said database. Moreover, in this aspect of the present invention, the step of retrieving the information preferably includes communicating said received information indicative of the telephone number of the third party to a second party, and receiving from the second party in response thereto said retrieved information. The retrieved information preferably is received through communications over the Internet.

The method further may include the step of initiating a telephone call to the telephone number of the third party that is indicated by said received information. The database may include an address book that is maintained by said data processing device. The method also further may include the steps of retrieving, from a database of said data processing device, additional information based on said received information, and displaying further information based on said retrieved additional information.

The method also may include the further steps of retrieving, from one or more other databases each remotely located to the data processing device, additional information based on said received information, and displaying further information based thereon.

The method also may include the additional step of determining whether the indicated telephone number of said received information is listed on a governmental "do not call" list of telephone numbers.

Again, the displayed information may pertain to one or more previous telephone calls made to the telephone number of the third party. Furthermore, the displayed information may include a website address of the third party, in which case the method preferably includes the further step of downloading and displaying information published by the third party on the Internet at the website address. Moreover, the displayed information may include information pertinent to the subject of the telephone call; customer service information and the telephone number is a customer service telephone number; technical support information and the telephone number is a technical support telephone number; information about the third party and the telephone number is for purchasing products from the third party; information about the third party and the telephone number is for purchasing services from the third party; information about products and the telephone number is for purchasing products from the third party; information about services and the telephone number is for purchasing services from the third party; information about product support information and the telephone number is for product support by the third party; content published by the third party via the Internet; or any combination of the foregoing.

Alternatively, or in addition thereto, the database may include a public listing of telephone numbers associated with names, email addresses, and/or mailing addresses, all of which may be included in the displayed information. Thus, the displayed information may include additional telephone numbers associated with the third party; additional telephone numbers associated with the indicated telephone number of said received information; and/or a name that is associated in the database with the indicated telephone number of said received information;

In a particular feature of this aspect, a telephonic device includes computer-readable medium having computer-executable instructions for performing a method. The method includes the steps of receiving input from a user indicative of a telephone number to be called; retrieving, from a database remotely located to the data processing device, information based on said telephone number; and displaying information based on said retrieved information for viewing by the user. The method further may include the step of initiating the telephone call following receipt of the user input indicative of the telephone number.

In any one of these features, the data processing device may comprises, for example, any electronic device including a desktop computer, a laptop computer, a personal digital assistant (PDA) or smartphone having PDA capabilities (such as the Treo 650 model phone from palmOne), a telephone such as a voice-over-IP (VoIP) telephone or a mobile phone, and a telephonic computer system. In some examples, the data processing device includes a microphone and a speaker by which a user can participate in the initiated telephone call. Alternatively, the data processing device may interface with an electronic device that is configured to dial the telephone number, and which itself may be adapted to allow participation in the telephone call by the user.

In another aspect of the present invention, a method includes the steps of generating a graphical user input (GUI) for receiving information from a user of the data processing device; receiving via said generated GUI information; and determining whether said received information is indicative of an IP address or is indicative of a telephone number. If the received information is indicative of an IP address, then the method includes the steps of requesting information from the IP address, receiving information based on said requested information from the IP address, and displaying information on a display based on said received information from the IP address. If the received information is indicative of a telephone number, then the method includes the steps of initiating a telephone call to the telephone number indicated by said received information.

In yet another aspect of the present invention, a method includes the steps of, receiving input from a current caller indicative of a telephone number to be called; retrieving from a database information based on said telephone number; and displaying information based on said retrieved information for viewing by the user. In this regard, the displayed information preferably pertains to a previous call made to the third party. The method further may include the step of initiating the telephone call following receipt of the user input indicative of the telephone number. The displayed information pertaining to a previous call made to the third party may include notes that were made by the previous caller pertaining to the previous call; the date, time, and duration of the previous call; the name of the person with whom the previous caller spoke in the previous call; and/or and identification of the previous caller of the previous call to the third party. The method also may include the further step of determining whether the indicated telephone number of said received information is listed on a governmental "do not call" list of telephone numbers. This step preferably is performed when a caller is a telemarketer.

In another aspect of the present invention, a method of providing, by a first party, access to a database by a second party, includes the steps of, receiving, from the second party, information indicative of a telephone number of a third party; searching the database to find Internet information that is maintained in the database in associated with the telephone number of the third party; upon finding Internet information that is maintained in association with the telephone number of the third party, retrieving the found Internet information from the database; and communicating Internet information to the second party based on said retrieved Internet information. With regard to this aspect, the information indicative of a telephone number of a third party preferably is received from the second party in one or more data packets transmitted over the Internet. The information indicative of a telephone number may comprises the telephone number itself, or the information indicative of a telephone number may comprise an arrangement of alphanumeric characters. The Internet information may comprise an IP address of the third party, a domain name of the third party, or a uniform resource locator of the third party, in which case the method preferably includes the step of resolving the domain name of the third party to an IP address and providing said resolved IP address to the second party. The step of resolving the domain name may comprise communicating the domain name to a domain name server and receiving, in response thereto, an IP address.

In a related aspect, a telephone number server (TNS) includes a data processing unit and a computer-readable medium disposed in communication with said data processing unit. The computer-readable medium contains a plurality of records, wherein each record associated information indicative of a telephone number of a third party with Internet information of the third party. The computer-readable medium further contains instructions executable by said data processing unit for performing a method comprising the steps of searching to find a record associating a specified telephone number with Internet information and, upon the finding of a record associating the specified telephone number with Internet information, retrieving the Internet information from the found record. Preferably, the telephone number server is disposed in communication with the Internet. Moreover, the telephone number server is configured to be publicly accessible via the Internet or, alternatively, the telephone number server is configured to be accessible via the Internet for a fee.

The telephone number server also may be configured to record a new record of a third party by receiving online the information indicative of the telephone number of the third party and the Internet information of the third party. A fee may be charged for this recordation.

Each record further may contain additional information of the third party, including a mailing address of the third party; and/or other telephone numbers of the third party. The information indicative of the telephone number may comprises the telephone number itself or, alternatively, the information indicative of the telephone number may comprises a unique identifier. Preferably, information indicative of a particular telephone number is uniquely associated with Internet Information of a third party.

In still yet another relates aspect of the present invention, a system includes a server configured for electronic communication via the Internet and a plurality of clients. Each client is capable of electronically communicating with said server via the Internet, and each client includes a data processing device configured to communicate information indicative of a telephone number to said server and to receive from said server Internet information. The server includes a data processing unit, and a computer-readable medium disposed in communication with said data processing unit. The computer-readable medium contains a plurality of records, each record associating information indicative of a telephone number of a third party with Internet information of the third party. Furthermore, the computer-readable medium further contains a plurality of instructions executable by said data processing unit for performing a method comprising the steps of, receiving information indicative of a particular telephone number of a third party from one of said clients, searching to find a record associating the particular specified telephone number with Internet information, and, upon the finding of a record associating the particular telephone number with Internet information, communicating via the Internet information from the found record to said one of said clients. A client may comprises, for example, a desktop computer, a laptop computer, a personal digital assistant (PDA), or a telephone such as, for example, a voice-over-IP (VoIP) telephone or a mobile phone, including a VoIP mobile phone.

In further regard to this method, the third party may provide to the first party both the Internet information of the third party and the information indicative of a telephone number of the third party for recording thereof in the database. Furthermore, access to the database is provided to the public at large for free or, alternatively, for a fee.

In still yet additional aspects of the present invention, computer-readable media have computer-executable instructions for performing the methods of the various aforementioned aspects of the present invention.

In addition to the aforementioned aspects and features of the present invention, it should be noted that the present invention further includes all combinations of such aspects and features. Such combinations are illustrated in the detailed description of one or more embodiments of the present invention set forth below.

DETAILED DESCRIPTION

Figure 1:
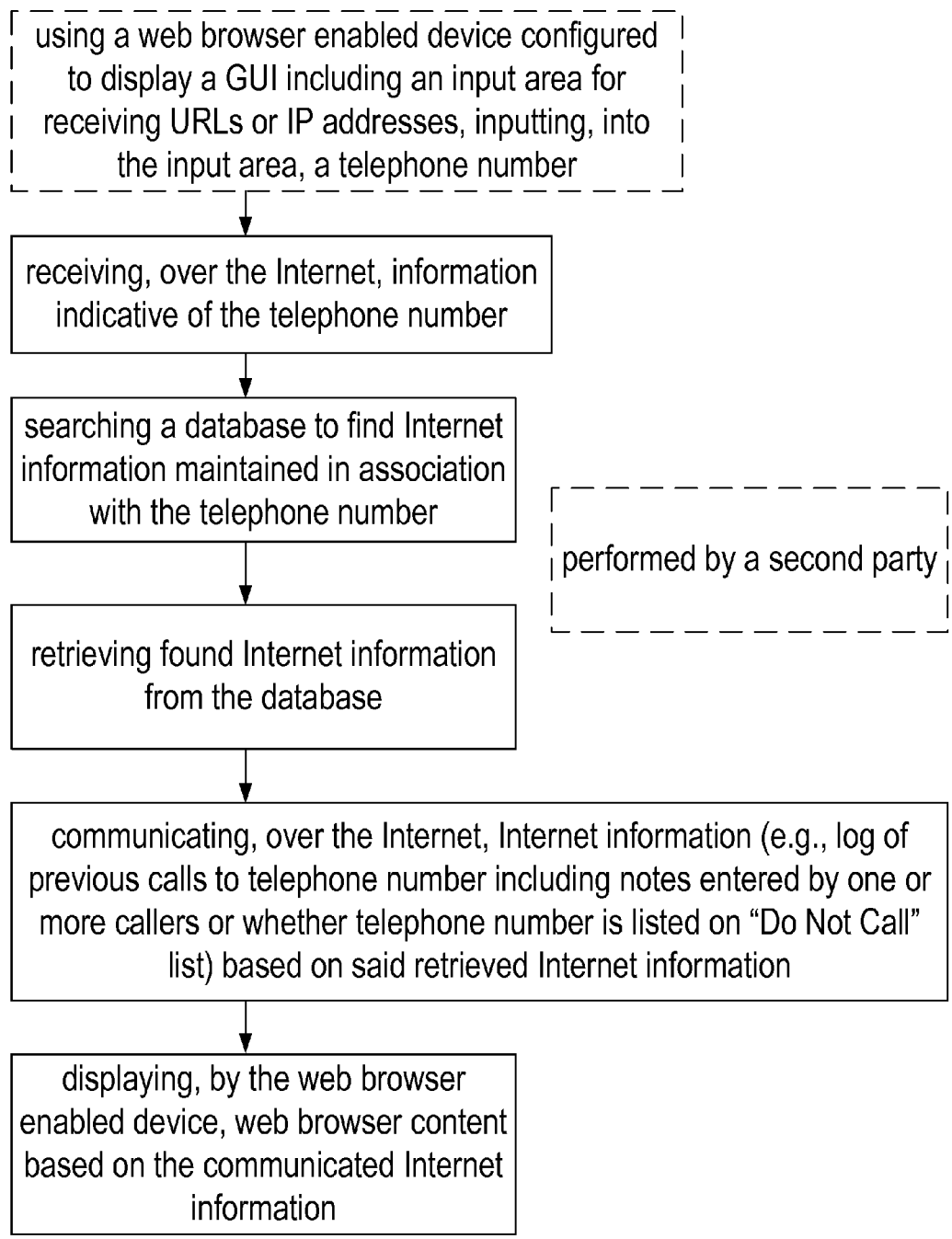
FIG. 1 illustrates a method in accordance with one or more preferred embodiments.

As a preliminary matter, it will readily be understood by one having ordinary skill in the relevant art ("Ordinary Artisan") that the present invention is susceptible of broad utility and application in view of the following detailed description of one or more embodiments. Any embodiment discussed and identified as being "preferred" is considered to be part of the best mode contemplated for carrying out the present invention. Other embodiments also may be discussed for additional illustrative purposes in providing a full and enabling disclosure of the present invention. Moreover, many embodiments, such as adaptations, variations, modifications, and equivalent arrangements, will be apparent from or reasonably suggested by the embodiments described herein without departing from the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes that are described herein are illustrative and not restrictive. Accordingly, it should be understood that, although steps of various processes may be shown and described as being in a sequence or temporal order, the steps of any such processes are not limited to being carried out in any particular sequence or order, absent a specific indication of such to achieve a particular intended result. Indeed, the steps in such processes generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Furthermore, it is important to note that, as used herein, "a" and "an" each means "at least one," but does not exclude a plurality. Thus, reference to "a picnic basket having an apple" describes "a picnic basket having at least one apple" as well as "a picnic basket having apples." When used herein to join a list of items, "or" denotes "at lease one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Turning now to a description of various aspects of the invention, one aspect of the invention preferably relates to a computer program for viewing html pages that includes what currently is a conventional input area for receiving uniform resource locators (URLs) or IP addresses. An example of this is the "address bar" in Internet Explorer. In accordance with the present invention, by typing in a telephone number into this input area, the computer dials the telephone number. The user then can speak with the recipient of the telephone call via the microphone and speakers of the computer system. The computer can also initiate the telephone call over any device that is interfaced with the computer, as desired.

Preferably, the telephone number is entered in an format that indicates the data is that of a telephone number and not indicative of an IP address. The format for a telephone number may be a ten digit number or seven digit number, and may be typed in the following formats: XXX-XXX-XXXX or XXX.XXX.XXXX, wherein these formats indicate to the program that what has been typed into the input area is not an IP address, uniform resource locator, or domain name but, instead, a telephone number. The format may also include some predesignated indication that what has been typed is, in fact, a telephone number, such as "tel" preceding or superseding the telephone number. In this example, the format would be: tel.XXX-XXX-XXXX or tel.XXX.XXX.XXXX.; or XXX-XXX-XXXX.tel or XXX.XXX.XXXX.tel. This indication identifies to the program that a telephone number has been entered, in response to which the program also may initiate a telephone call to the number.

In accordance with features of the present invention, upon entering the telephone number into the input area, the computer not only initiates the telephone call, but also retrieves and displays information pertaining to the telephone call and/ or the recipient of the telephone call. Such information may include, for example, the name of the recipient (or the name to which the telephone number being called is listed); the address of the recipient (or the address to which the telephone number being called is listed); other telephone numbers that are listed for the recipient (or the name to which the telephone number being called is listed); and/or a log of previous calls to the telephone number being called, which log preferably would include notes, if any, that were entered by the caller for each of the previous calls, as well as the time and date, and duration, of each of the calls, and the name of the recipient with whom the caller spoke. Moreover, this information could be stored locally on the computer executing the program. Alternatively, such information (especially with regard to the listed information) could be obtained from database resources that are available on the Internet. For example, by visiting the search page for Google and entering a ten digit telephone number, the listed name and address may appear as part of the search results for a given telephone number. The information also may include whether the number being called is listed on a "Do Not Call" list, such as the list maintained by the federal government to reduce the number of telemarketing calls being made, or such as a similar list that is maintained by a state.

Based on information that is retrieved, information is displayed preferably within a window of the program in similar manner as an html page. Moreover, the information may be contained on several such pages with hyperlinks between the pages.

In a related aspect of the present invention, a resource is maintained in communication with the Internet for mapping telephone numbers to Internet information such as, for example, domain names and/or IP addresses. Such as server that records telephone numbers in association with Internet information is referred to herein as a "Telephone Number Server" or "TNS". The TNS is somewhat similar to a traditional Domain Name Server ("DNS") in that it maps one unique identifier to another and is available for use via the Internet. This resource preferably comprises a database including the aforesaid mappings and software for receiving and processing mapping requests, including the identification of a domain name or IP address for a given telephone number.

In accordance with a combination of various preferred aspects of the present invention, information that is retrieved by the program when a telephone number is entered into the input area includes the web page that is referenced by the mapping of the telephone number maintained in the TNS. As an example, and not by way of limitation, entering the telephone number for customer service for a bank into the input area of the program not only initiates a call to the bank's customer service center, but also acquires and displays the web page of the bank relating to customer service, including services that may be obtained directly from the web page as well as via telephone.

What is claimed is:

1. An invention comprising a system, the system comprising,
   (a) a server configured for electronic communication via the Internet; and
   (b) a plurality of clients, each client being capable of electronically communicating with said server via the Internet, each client of said plurality of clients comprising a web browser enabled device configured to
      (i) display a graphical user interface (GUI) including an input area for receiving uniform resource locators (URLs) or IP addresses, and
      (ii) communicate, over the Internet, information indicative of a telephone number input via the input area to said server, and
      (iii) receive, over the Internet from said server, Internet information;
   (c) wherein said server comprises,
      (i) a data processing unit, and
      (ii) a non-transitory computer-readable medium disposed in communication with said data processing unit, said computer-readable medium containing,
         (A) a plurality of records, each record associating,
            (1) information indicative of a telephone number of a third party, with
            (2) Internet information of the third party, and
         (B) instructions executable by said data processing unit for performing a method comprising the steps of,
            (1) receiving, over the Internet, information indicative of a particular telephone number of a third party from one of said clients,
            (2) searching to find a record associating the particular specified telephone number with Internet information, and
            (3) upon the finding of a record associating the particular telephone number with Internet information, communicating, via the Internet, information from the found record to said one of said clients;
   (d) wherein the Internet information comprises a log of previous calls to the telephone number, the log including notes entered by one or more callers of the previous calls.

2. The invention of claim 1, wherein the information indicative of a telephone number is received in one or more data packets transmitted over the Internet.

3. The invention of claim 1, wherein the information indicative of a telephone number comprises the telephone number itself.

4. The invention of claim 1, wherein the information indicative of a telephone number comprises an arrangement of alphanumeric characters.

5. The invention of claim 1, wherein the Internet information comprises an IP address of the third party.

6. The invention of claim 1, wherein the Internet information comprises a domain name of the third party.

7. The invention of claim 6, wherein the method performed by said instructions executable by said data processing unit further comprises the step of resolving the domain name of the third party to an IP address and providing said resolved IP address to the second party in step (d).

8. The invention of claim 7, wherein said step of resolving the domain name comprises communicating the domain name to a domain name server and receiving, in response thereto, the IP address.

9. The invention of claim 1, wherein the Internet information comprises a uniform resource locator.

10. The invention of claim 1, wherein the telephone comprises a smartphone.

11. The invention of claim 1, wherein the telephone comprises a voice-over-IP (VoIP) telephone.

12. The invention of claim 1, wherein a said web browser enabled device is further configured to initiate a telephone call.

13. An invention comprising a system, the system comprising,
   (a) a server configured for electronic communication via the Internet; and
   (b) a plurality of clients, each client being capable of electronically communicating with said server via the Internet, each client of said plurality of clients comprising a web browser enabled device configured to
      (i) display a graphical user interface (GUI) including an input area for receiving uniform resource locators (URLs) or IP addresses, and
      (ii) communicate, over the Internet, information indicative of a telephone number input via the input area to said server, and
      (iii) receive, over the Internet from said server, Internet information;
   (c) wherein said server comprises,
      (i) a data processing unit, and
      (ii) a non-transitory computer-readable medium disposed in communication with said data processing unit, said computer-readable medium containing,
         (A) a plurality of records, each record associating,
            (1) information indicative of a telephone number of a third party, with
            (2) Internet information of the third party, and
         (B) instructions executable by said data processing unit for performing a method comprising the steps of,
            (1) receiving, over the Internet, information indicative of a particular telephone number of a third party from one of said clients,
            (2) searching to find a record associating the particular specified telephone number with Internet information, and
            (3) upon the finding of a record associating the particular telephone number with Internet information, communicating, via the Internet, information from the found record to said one of said clients;
   (d) wherein the Internet information comprises an indication that the telephone number of the third party is listed on a "Do Not Call" list.

14. The invention of claim 13, wherein the information indicative of a telephone number is received in one or more data packets transmitted over the Internet.

15. The invention of claim 13, wherein the information indicative of a telephone number comprises the telephone number itself.

16. The invention of claim 13, wherein the information indicative of a telephone number comprises an arrangement of alphanumeric characters.

17. The invention of claim 13, wherein the Internet information comprises an IP address of the third party.

18. The invention of claim 13, wherein the Internet information comprises a domain name of the third party.

19. The invention of claim 13, wherein the Internet information comprises a uniform resource locator.

* * * * *